US009430568B2

(12) United States Patent
Xie et al.

(10) Patent No.: US 9,430,568 B2
(45) Date of Patent: Aug. 30, 2016

(54) METHOD AND SYSTEM FOR QUERYING INFORMATION

(71) Applicant: Alibaba Group Holding Limited, George Town (KY)

(72) Inventors: Yuheng Xie, Hangzhou (CN); Wenwu Ou, Hangzhou (CN)

(73) Assignee: Alibaba Group Holding Limited (KY)

( * ) Notice: Subject to any disclaimer, the term of this patent is extended or adjusted under 35 U.S.C. 154(b) by 36 days.

(21) Appl. No.: 14/487,321

(22) Filed: Sep. 16, 2014

(65) Prior Publication Data
US 2015/0066888 A1 Mar. 5, 2015

Related U.S. Application Data

(63) Continuation of application No. 12/655,980, filed on Jan. 11, 2010, now Pat. No. 8,898,180.

(30) Foreign Application Priority Data

Jan. 12, 2009 (CN) .......................... 2009 1 0001555

(51) Int. Cl.
G06F 17/30 (2006.01)
(52) U.S. Cl.
CPC ... G06F 17/30864 (2013.01); G06F 17/30345 (2013.01); G06F 17/30672 (2013.01)
(58) Field of Classification Search
None
See application file for complete search history.

(56) References Cited

U.S. PATENT DOCUMENTS

| 6,502,091 B1* | 12/2002 | Chundi .................. G06F 17/30 707/738 |
| 6,567,797 B1 | 5/2003 | Schuetze et al. |
| 6,845,374 B1 | 1/2005 | Oliver et al. |
| 7,092,936 B1 | 8/2006 | Alonso et al. |
| 7,149,804 B2 | 12/2006 | Chatani |
| 7,428,529 B2 | 9/2008 | Zeng et al. |
| 7,577,665 B2 | 8/2009 | Ramer et al. |
| 7,590,651 B2 | 9/2009 | Fujio et al. |
| 7,689,554 B2 | 3/2010 | Jones et al. |
| 7,725,453 B1* | 5/2010 | Chen ................. G06F 17/30864 707/711 |
| 7,734,641 B2 | 6/2010 | Kanigsberg et al. |
| 7,890,526 B1* | 2/2011 | Brewer ............... G06F 17/3097 707/767 |
| 8,655,905 B2* | 2/2014 | Brewer ............... G06F 17/3097 707/758 |

(Continued)

FOREIGN PATENT DOCUMENTS

| CN | 101241512 A | 8/2008 |
| CN | 101436186 A | 5/2009 |

(Continued)

OTHER PUBLICATIONS

Cui et al., "Query Expansion by Mining User Logs", IEEE Transactions on Knowledge and Data Engineering, vol. 15, No. 4, Jul./Aug. 2003, pp. 829-839.

(Continued)

Primary Examiner — Bai D. Vu
(74) Attorney, Agent, or Firm — Van Pelt, Yi & James LLP

(57) ABSTRACT

Performing a query includes receiving a user input, determining a first set of query keywords based at least in part on the user input, obtaining, based on at least some of the first set of query keywords, a user feedback log that includes historical query results, determining a second set of query keywords based on the user feedback log, and making a query based on at least some of the second set of query keywords.

17 Claims, 5 Drawing Sheets

(56) References Cited

U.S. PATENT DOCUMENTS

| | | | |
|---|---|---|---|
| 2003/0149704 A1* | 8/2003 | Yayoi | G06F 17/30648 |
| 2005/0055341 A1* | 3/2005 | Haahr | G06F 17/30648 |
| 2006/0020591 A1* | 1/2006 | Kommers | G06F 17/3097 |
| 2006/0129531 A1* | 6/2006 | Bates | G06F 17/30864 |
| 2006/0156326 A1* | 7/2006 | Goronzy | G06F 17/30035 725/13 |
| 2006/0253427 A1* | 11/2006 | Wu | G06F 17/3064 |
| 2007/0067279 A1* | 3/2007 | Bonabeau | G06F 17/30864 |
| 2007/0118512 A1* | 5/2007 | Riley | G06F 17/30672 |
| 2007/0214154 A1* | 9/2007 | Ducatel | G06F 17/30864 |
| 2007/0276807 A1* | 11/2007 | Chen | G06F 17/30112 |
| 2008/0091670 A1 | 4/2008 | Ismalon | |
| 2008/0114743 A1 | 5/2008 | Venkataraman et al. | |
| 2008/0222119 A1* | 9/2008 | Dai | G06F 17/3087 |
| 2008/0294625 A1 | 11/2008 | Takeuchi | |
| 2008/0301089 A1* | 12/2008 | Makeev | G06F 17/30648 |
| 2009/0198644 A1* | 8/2009 | Buchner | G06F 17/3064 |
| 2009/0259646 A1 | 10/2009 | Fujita et al. | |
| 2009/0299991 A1* | 12/2009 | Zarzar Charur | G06F 17/3064 |
| 2010/0138400 A1 | 6/2010 | Curtis et al. | |
| 2010/0161659 A1 | 6/2010 | Takeyasu | |
| 2010/0179956 A1 | 7/2010 | Jammalamadaka et al. | |
| 2010/0293174 A1 | 11/2010 | Bennett et al. | |
| 2011/0035397 A1 | 2/2011 | Joshi et al. | |
| 2011/0066650 A1 | 3/2011 | Fuxman et al. | |
| 2011/0078127 A1 | 3/2011 | Lin et al. | |
| 2011/0208730 A1 | 8/2011 | Jiang et al. | |
| 2011/0302172 A1 | 12/2011 | Chandrasekar et al. | |
| 2011/0314012 A1 | 12/2011 | Kenthapadi et al. | |
| 2012/0226641 A1 | 9/2012 | Hu et al. | |
| 2012/0239679 A1 | 9/2012 | Gupta | |

FOREIGN PATENT DOCUMENTS

| | | |
|---|---|---|
| CN | 101751422 A | 6/2010 |
| CN | 101751437 A | 6/2010 |
| JP | H07219957 A | 8/1995 |
| JP | 2002092033 A | 3/2002 |
| JP | 2005031949 A | 2/2005 |
| JP | 2006277884 | 10/2006 |
| JP | 2008176746 A | 7/2008 |
| JP | 2009169541 | 7/2009 |
| JP | 2010003134 | 1/2010 |

OTHER PUBLICATIONS

Cui et al. 'A Statistical Query Expansion Model Based on Query Logs', Journal of Software, vol. 14, No. 9, 2003.

* cited by examiner

METHOD AND SYSTEM FOR QUERYING INFORMATION

CROSS REFERENCE TO OTHER APPLICATIONS

This application is a continuation of co-pending U.S. patent application Ser. No. 12/655,980, entitled METHOD AND SYSTEM FOR QUERYING INFORMATION filed Jan. 11, 2010 which claims priority to People's Republic of China Patent Application 200910001555.7 entitled METHOD AND SYSTEM FOR WORD MATCHING AND INFORMATION QUERY, filed Jan. 12, 2009 which is incorporated herein by reference for all purposes.

FIELD OF THE INVENTION

The present application relates to data processing technology and, in particular, to a method and a device for word matching and information query.

BACKGROUND OF THE INVENTION

Latent word meaning usually refers to the latent meaning of a word or phrase and it usually may be expressed in one or more words or phrases. For example, the latent word meaning of "冰箱" (fridge) generally refers to "电冰箱" (refrigerator), while the latent word meaning of "棉拖" (cotton slippers) generally refers to "全棉拖鞋" (all-cotton slippers), etc.

Many studies have been carried out on the automatic finding of latent semantics, most of which attempt to find near-synonym using the co-appearance and link relation of words. Some existing techniques use synonyms to determine the relationship between words. The number of vocabulary entries obtained based on manual-labeled corpora, however, is limited and it can be difficult to guarantee the effect of automatic finding of synonyms.

The indexing mode of a search engine typically includes separate word search, word partitioning indexing, and hybrid indexing. When using the separate word indexing technique, the distance between the separate words in a file typically needs to be calculated. Thus, the efficiency is often low and accuracy often poor. The problem is particularly pronounced in languages without natural word separators (e.g., spaces) between words, such as Chinese. For example, the differences among "农药" (pesticides), "神农药厂" (Shen Nong pharmaceuticals) and "神农农药厂" (Shen Nong pesticides factory) cannot be readily distinguished using separate word indexing. In contrast, the word partitioning search technique has higher accuracy and is fast, but the recall rate is often low. For example, when it searches for "冰箱" (fridge), only the results for "冰箱" (fridge) can be found and the results of "电冰箱" (refrigerator) cannot be found. For the hybrid indexing method in which the separate word indexing and the word partitioning indexing are combined, it usually first queries according to the word partitioning indexing technique and then queries according to the separate word indexing technique. For example, when "玻璃瓶" (glass bottle) is queried, the results of "玻璃瓶" (glass bottle) are found according to word partitioning indexing and then other results are found according to separate word indexing. This makes up for the disadvantages of the two earlier-mentioned methods, but "玻璃瓶子" (glass bottles) is found according to separate word indexing and the search engine cannot distinguish between "玻璃瓶子" (glass bottles) and "生产玻璃瓶颈在于" (causing bottle neck), therefore the accuracy is affected. More effective search techniques are therefore needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
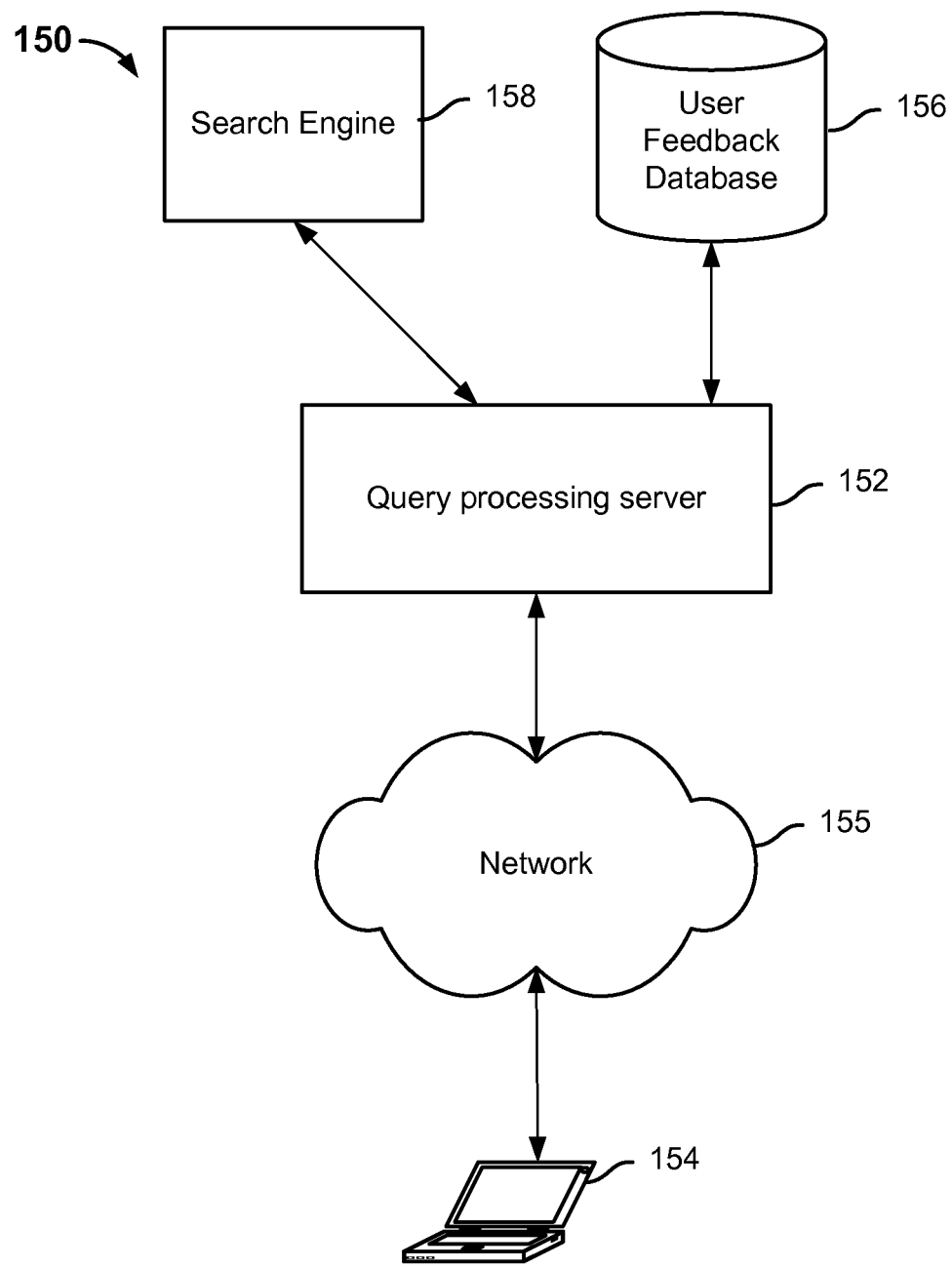
FIG. 1A is a block diagram illustrating an embodiment of a query processing system.

FIG. 1A is a block diagram illustrating an embodiment of a query processing system. In the example shown, query processing system 150 includes a query processing server 152, which in some embodiments include one or more devices having one or more processors coupled to one or more memories. Query processing server 152 includes one or more interfaces configured to receive user inputs, for example user inputs sent by client devices such as 154 over a network 155, which may be the Internet or other communications network. Examples of a communication interface include without limitation external connections, such as a port, cable, wired or wireless network interface card, etc., and internal connections, such as a communication bus. In some embodiments, the client device is a computing device such as a computer or mobile device with networking capabilities. Query processing server 152 has access to a user feedback database 156 that stores user feedback logs.

As will be described in greater detail below, upon receiving user input, the query processing server processes the user input to generate query keywords based on the user input and user feedback log. In some embodiments, the query keywords are sent to a search engine 158 which locates and returns search results based on the query keywords. In some embodiments, the search engine is configured to search for specific content stored in a database, such as product information on an electronic commerce website. In some embodiments, the search engine is configured as a general purpose search engine that searches for content on the Internet. The functions of the keyword search engine and the query processing server are combined in some embodiments; thus, the query processing server uses the keywords to perform search and returns the results directly. The search results and user response to the search results (such as user selection/click-through) are updated in the user feedback database.

Figure 1B:
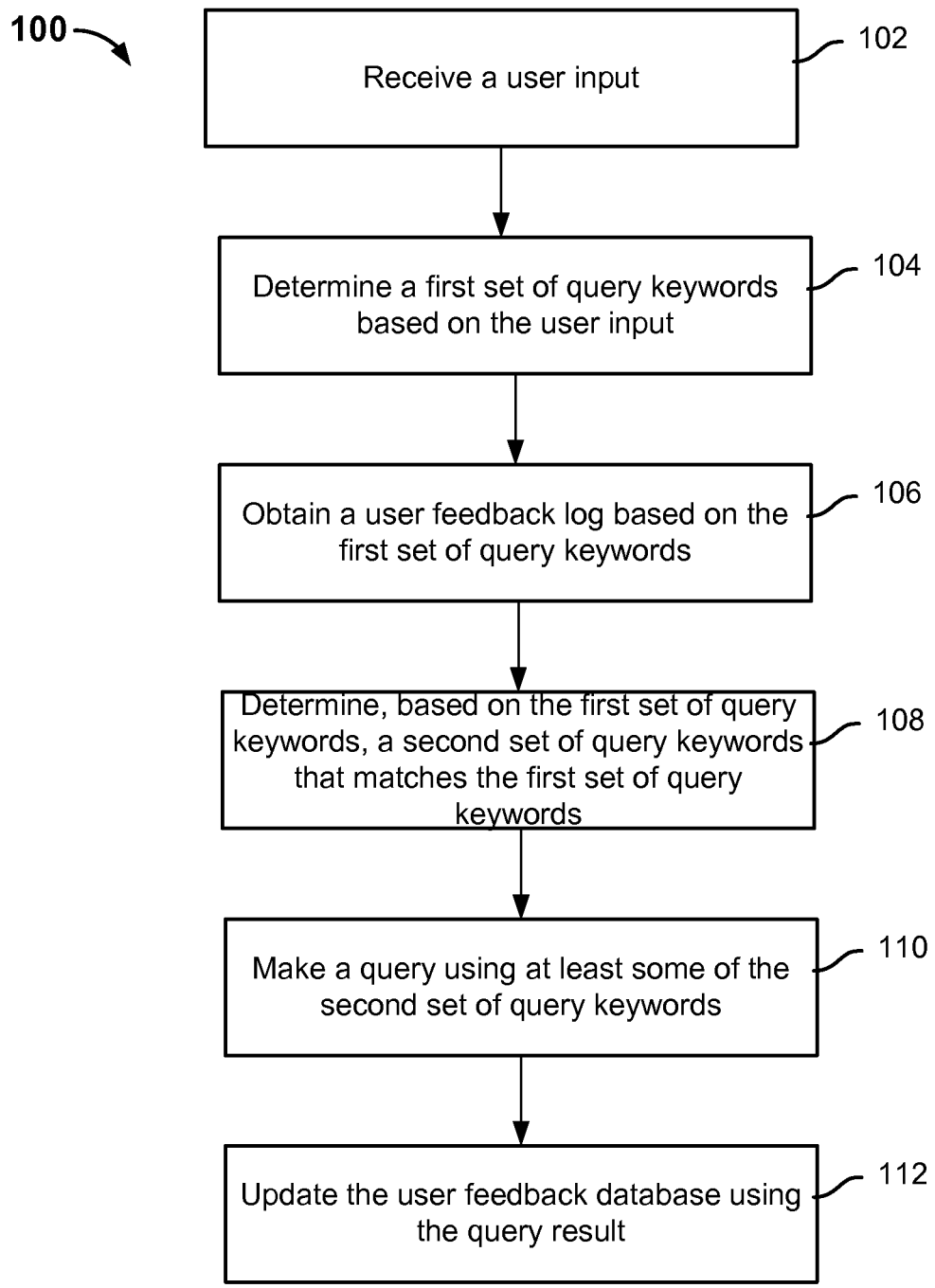
FIG. 1B is a flowchart of an embodiment of a process for performing a query.

FIG. 1B is a flowchart of an embodiment of a process for performing a query. Process 100 may be performed on a system such as 150. At 102, a user input that includes a plurality of symbols is received. In some embodiments, the user input is sent from a client device such as 154 via a web browser or other user interface tool to the query processing server. As used herein, a symbol refers to a character or a letter. A number of characters/letters form a word.

At 104, a first set of query keywords are determined based on the user input. The first set of query keywords may include one or more words. In some embodiments, the user input is used directly as the first set of query keywords. In some embodiments, the user input is partitioned and the partitioned words are used as the first set of query keywords. In some cases the user input is in a letter based language such as English, where words are naturally separated by spaces. The user input therefore does not require context based processing and the first set of query keywords include the words in the user input and/or stemmed input words. In some cases, character based languages such as Chinese is used as the user input language. Since there are no specific character dividers in such languages, the input symbols are partitioned into words based on context, and the first set of query keywords include the partitioned words. In some embodiments, the first set of query keywords also includes the characters in the user input, which are available without any partitioning.

At 106, a user feedback log is obtained based on the first set of query keywords. The user feedback log, which is obtained from a database such as 156 in some embodiments, includes historical query results using the first set of query keywords as the target (or object) of the query and the selection frequency (also referred to as the click-through rate) by the users. In various embodiments, the selection frequency may include selection frequency on the previous query results and/or selection frequency on the contents of previous results. The user feedback log is gathered by the search engine. In some embodiments, keywords input by the users, past query results (e.g., web page file identifiers/ universal resource locators (URLs)), click frequencies on the past query results, display frequencies of the past query results, etc. are collected by the search engine and stored. Suppose, for example, the first set of query keywords include the words "western medicine" or "西药", then the user feedback log includes records of all or some of the results returned when users previously made queries using the words "western medicine" or "西药".

At 108, a second set of query keywords that matches the first set of query keywords based on the user feedback log is determined. In some embodiments, the second set of query keywords includes latent meaning words derived based on the user feedback log. All or a portion (such as a randomly selected portion) of the previous records may be used to establish latent word meaning. The automatic finding of latent words with latent meaning refers to the finding of one or more words (or phrases) with relevant or similar word meaning as the original word. Based on user feedback logs, the latent word meaning relationship between the query word and the historical query results that embody the user's intention can be reliably and automatically found. The latent word meaning relationship is in turn used to improve the accuracy rate and intelligence of the search engine. Therefore, the user feedback log may include all previous historical query results that use the first set of query keywords as the search target and all previous click selecting frequencies of users on the historical query results.

In some embodiments, determining the second set of query keywords includes: obtaining the content of historical query results of the first set of keywords, partitioning the content of the historical query results to obtain a set of partitioned words, and determining the second set of query keywords based on selection frequencies of the partitioned words.

At 110, a query is made using at least some of the second set of query keywords, and query results are obtained. In some embodiments, the query keywords are input into a search engine to obtain the query results.

At 112, query results based on the second set of query keywords are used to update the user feedback database from which the user feedback log is obtained.

In various embodiments, the first set of query keywords belong to one or more of the following types:

Type 1: words adjacent to the partitioned words. For purposes of illustration, the statistical result related to the selection frequency in such a case is denoted as P1 in the following description.

Type 2: words including a portion of the partitioned words. The statistical result related to the selection frequency in such a case is denoted as P2 in the following description.

Type 3: words including partitioned word. The statistical result related to the selection frequency in such a case is denoted as P3 in the following description.

The user feedback log is adapted to record information corresponding to the query word such as historical query results and click frequencies, and display frequencies of the historical query results; for example, the query result may be a web page. For a given query word, a resulting web page with higher selection frequency is deemed to be more relevant to the query word. The latent word meaning of a word refers to another word that is synonymous, near-synonymous or partially synonymous to the original word, for example, "玻璃瓶" and "玻璃瓶子" ("glass bottle" and "glass bottles"); in another example, "双人床", "单人床" and "弹簧床" ("double bed", "single bed", "mattress bed") all have the latent word meaning of "床" ("bed") which is a place for people to sleep, but "花床" ("flower bed") does not have the latent word meanings of "床" ("bed").

At least three types of latent word meanings are used in various embodiments of this application. The first type of latent word meanings are words that often appear in pairs, for example, "Motorola" and "company" ("摩托罗拉" and "公司"), "Motorola" and "mobile phone" ("摩托罗拉" and "手机"). Such a relationship indicates a correlation between two words. Stated another way, some words after word partitioning are deemed to be adjacent (at least in meaning) to the query word. The second type of latent word meaning for a word includes a plurality of words that appear in a certain order. For example, the query keyword "glass bottle" has corresponding latent words "glass" and "bottle", "玻璃瓶" has latent meaning words "玻璃" and "瓶子", and "美女" (beauty) has corresponding latent words "美丽的" (beautiful), "女人" (woman), that is, the partitioned words includes at least a portion of the query word after word partitioning. The third type of latent word meaning is a word or character that forms another word. For example, "虾" (shrimp) and "对虾" (prawns), "酒" (alcohol) and "啤酒" (beer), that is, the partitioned words include the query keyword. Such latent word meanings automatically found via user feedback such as click frequency usually represents the intention of the searched key word input by a user, which can be used to improve the accuracy rate of the search engine. For example, when a user searches for "床" ("bed"), the actual intention of the user is usually a bed for sleeping, for example, "单人床" ("single bed"), "双人床" ("double bed"), and "木板床" ("wooden bed"), rather than a general support structure such as "花床" ("flower bed") or some kind of machinery "车床" ("lathe"). Based on user feedback such as selection of displayed search results, it can be determined that that "单人床" ("single bed"), "双人床" ("double bed"), and "木板床" ("wooden bed") have a latent word meaning of "床" (bed for sleeping), while as "花床" ("flower bed") does not has a latent word meaning of "床".

In some embodiments, the first set of query keywords is obtained according to steps 102 and 104 and the historical query results (web page URLs, file IDs, etc.), the click frequencies, and display frequencies of the historical query results or a combination thereof is obtained according to step 106. Word partitioning is performed on the first set of query keywords. If the first set of query keywords includes a plurality of words, the corresponding historical query results and related information in the user feedback log of the query words are added to each user feedback log corresponding to each partitioned word. Thus, each partitioned word will have its own corresponding historical query results. As a result of the processing, each query of the user feedback log will be an independent partitioned word. The above processing related to P1, P2, P3 will be respectively performed on each partitioned word or a part of the partitioned word and the selection of historical query results may be determined according to the information of total query times, click times, exposure times of the historical query results, or a combination thereof. The historical query results corresponding to the partitioned words are processed respectively. All character strings that totally match the partitioned words are found in the historical query results in the user feedback log (here, totally matching means that the partitioned word is a substring of the character string) and the length of the character string may be the length of a sentence that contains the partitioned words, or M times of the length of a sentence that contains the partitioned words, wherein M may be an arbitrary integer greater than 1. Depending on the type of the partitioned word, the corresponding statistical result of P1, P2, or P3 is computed for each partitioned word. For purposes of illustration, files are used as the query results in the following embodiments, although other results such as URLs or other appropriate search objects can be used as well. During implementation, the selection frequencies of the query results and/or the selection frequencies of the contents of the query results may be considered.

In some embodiments, the first set of query keywords is obtained based on user input according to steps 102 and 104 and historical query results (web page URLs and file IDs, etc.), click frequencies, display frequencies of the historical query results, or a combination thereof is obtained from user feedback log according to step 106. Meanwhile, a query dictionary may be optionally preconfigured and information corresponding to different search words, such as historical query results (web page URLs and file IDs, etc.), click frequencies, display frequencies of the historical query results, or a combination thereof may be input in advance. This way, when the first set of query keywords is input, the second set of query keywords may be obtained quickly and easily using the query dictionary. That is, the content of the previous user feedback log is pre-stored for query and the query dictionary may also be updated according to a new user feedback log; however, the user feedback log may also be invoked after the first query key word is input.

The processing of different types of partitioned words is discussed.

Type 1: partitioned words being adjacent to the first set of query keywords. If the first set of query keywords includes a partitioned word of a character string, for example, the first query keyword is "美女" and the historical query result in the user feedback log is a file that includes the content "中国|古代|美 女|西施|名|夷光| |春秋|战 国|时期|出生" (Chinese|ancient|beauty|Xishi|named|Yiguan|, born|during|Chunqiu|Zhanguo|period" (here, "|" represents the place where word partitioning occurs). Here, the number of appearances (T) of the partitioned words immediately adjacent to the query keyword in the query result string is multiplied by the click frequency and/or display frequency of the query result, and the product is taken as a coefficient of weight, marked as times weight (1), and is added to the count P1 of the total query result. P1 includes the weight (1) of the number of times each word that appears in front of or behind the first query keyword. For example, in this example, if the weight of the file is 0.5, the result corresponding to "古代" (ancient) and "西施" (Xishi) in P1 (here, two words are immediately adjacent to the query keyword and T=1) will be correspondingly increased by 0.5.

Type 2: partitioned words include portions of words in the first set of query keywords. If the first set of query keywords is included in a plurality of adjacent word partitioning results. For example, the first query keyword is "美女" (beauty) and the historical query result in the user feedback log has the partitioned content "西施|是|个|美 丽的|女人|" (Xishi|is|a|beautiful|woman|). At this point, the number of appearances of a partitioned word that includes the first query keyword appears is multiplied by the click frequency and/or display frequency of the query result, the product is taken as a coefficient of weight, marked as times weight (2), and it is added to the count P2 of the total query results. P2 includes the weight (2) of the number of times a plurality of partitioned words of the first set of query keywords appears in the same order. Therefore, in this example, if the weight of the file is 0.3, the result corresponding to "美丽的|女人" in P2 is increased by 0.3.

Type 3: partitioned words include the first set of query keywords. If the first query keyword is a substring of a partitioned word, for example, the query word is "冰箱" (fridge) and the historical query result in the user feedback log has the partitioned content "电冰箱|空调 器|原理|与|维修" (refrigerator|air conditioning|maintenance|and|repair). At this point, the number of appearances of the partitioned word containing the first query keyword is multiplied by the click frequency and/or display frequency of the query result, the product is taken as a coefficient of weight, marked as times weight (3), and it is added to count P3 of the total query result, wherein P3 is the weight (3) of the number of appearances of a partitioned word including the first query keyword in the query result. Therefore, in this example, if the weight of the file is 0.8, the result corresponding to "电冰箱" (refrigerator) in P3 is increased by 0.8.

The processing steps are repeated until every partitioned word in all the historical query results in the user feedback log is processed. Based on the weighted sum of the number of times the partitioned word appears according to P1, partitioned words of which the times weight sum is larger than a first threshold are taken as the first latent word meaning relation of the query word. Similarly, according to the weighted sum of the number of times partitioned words appear in P2 and P3, partitioned words of which the times weight sums are larger than a second threshold and a third threshold respectively are taken as the second latent word meaning and the third latent word meaning relation of the word.

In various embodiments, one or more of the latent word meanings are processed. The first, second, and third thresholds may be fixed thresholds or dynamically adjusted according to the overall query results of the query word. For example, weighted summation is performed on all query result files that contain the matched character string and then the result obtained is multiplied by a coefficient, which may be dynamically set according to the query results. By setting a threshold, the words of the latent word meaning of a part of the query word are selectively determined instead of being an unconditionally feedback.

In some embodiments, when the second set of query keywords that matches the first set of query keywords is determined according to the historical query results and selection frequencies, it may require that the selection frequencies be larger than the given threshold, wherein, the selection frequencies may be the selection frequencies of users on the historical query results and it may also be the selection frequencies of users on the contents of historical query results. The click frequency and/or display frequency of a file or its content is taken as a coefficient of weight. The coefficient may be one or both of the click frequency and the display frequency and the value of the coefficient may have a linear or nonlinear relation with the click and display frequency. For example, the coefficient wherein both frequencies are greater than a given threshold is set to 1, otherwise, the coefficient is 0; or the coefficient with the highest click frequency and display frequency is 1 and other coefficients are normalized to [0,1] by being divided by the maximum value. The purpose for selecting the selection frequency is to find the latent word meaning using the selection frequency. Some information with low selection frequency may be filtered by the given threshold, thereby improving the speed of the finding of the latent word meaning and avoiding the interference of some information at the same time.

In various embodiments, the selection frequencies include one or more of: click frequencies on the historical query results, display frequencies on the historical query results, reading time on the historical query results, and importance of the historical query results. The click frequency and display frequency (or one of them) of the file is taken as a coefficient of weight and the coefficient may also be other information of the file, for example, a combination of the amount of time users spent reading the file, a degree of importance, the click frequency, and the display frequency.

In implementation, relationship between the query word and its latent word meaning is commutative. For example, "玻璃|瓶了" (glass|bottles) is the latent word meaning of "玻璃瓶" (glass bottle), and "玻璃瓶" (glass bottle) is the latent word meaning of "玻璃|瓶了" (glass|bottles); "电冰箱" (refrigerator) is the latent word meaning of "冰箱" (fridge), and "冰箱" (fridge) is the latent word meaning of "电冰箱" (refrigerator).

Different techniques may be used to determine the first set of query keywords in step 104. One technique involves word partitioning being first performed on the information content that is input by a user and the partitioned words are used to obtain the query keywords. In another technique, the information content is decomposed into characters and each character is used as a query keyword. Different ways of keyword determination may be performed at the same time, or combined. In the combined technique, word partitioning is first performed on the query word input by a user. Word partitioning result query is performed using the partitioned words. The latent semantics of the partitioned words of the query words are used to perform additional query and finally separate word query may be performed. Word partitioning result query refers to that the correlated result is queried from the word partitioning index according to the word partitioning result of the query word; separate word query refers to that the result is queried from the separate word indexing; and latent semantics query refers to that the query result is obtained using the latent meaning of the query word.

For a word of the first latent word meaning, the correlated result is queried via "query word+word of the first latent word meaning", if the query word is "摩托罗拉" (Motorola), the corresponding word of the first latent word meaning is "摩托罗拉公司" (Motorola company) and "摩托罗拉手机" (Motorola mobile phone); here, the first type of latent word meanings of "摩托罗拉" (Motorola) are "公司" (company) and "手机" (mobile phone). For word of the second type of latent word meaning, the query result is obtained using "adjacent query word" of the second latent word meaning, for example, the corresponding words of the second latent word meaning of "玻璃瓶" (glass) are "玻 璃 |瓶 了" (glass-|bottles). For word of the third type of latent word meaning, the query result is obtained via word of the third latent word meaning, for example, when "电冰箱" (refrigerator) is queried, the word of the third latent word meaning is "冰箱" (fridge).

When the correlation degree between a query word and a file is calculated based on the query result of latent word meaning query, it should be higher than that of the result obtained via separate word query. The value of the correlation degree will influence the ordering of the query result (according to the correlation degree and web page importance degree, etc.).

In some embodiments, when the first set of query keywords is obtained in step 104, the user characteristics of the user that inputs the first set of query keywords may also be obtained; that is, the user characteristics of the user may be obtained when the user inputs the first set of query keywords.

Thus, when the user feedback log is obtained in step 106, the user feedback log may also be obtained according to the user characteristics.

Or, when the user feedback log is obtained, the user feedback log obtained includes historical query results that take words in the first set of query keywords as the target and the selection frequencies of users on the historical query results, while these historical query results include the user characteristic.

Or, when it determines the second set of query keywords according to the user feedback log, the second set of query keywords may be determined according to the user characteristic.

That is, when the second set of query keywords is matched according to the user feedback log, a different second set of query keywords may also be determined according to the user characteristic of the user that inputs the first set of query keywords. By selecting the user feedback log using the user characteristic, it is favorable to further find the latent word meaning of the first set of query keywords. For example, according to the above embodiments, when a user searches for "床", the actual intention of the user is mostly a bed for sleeping, such as "单人床" (single bed), "双人床" (double bed) and "木板床" (wooden bed), rather than a mechanical equipment such as "机床" or "车床" (lathe). At this point, it may be inferred based on the feedback of the user, such as user selection of content pertaining to a bed for sleeping, that the former has a latent word meaning of "床" (bed) and the latent word meaning does not contain "机床" (lathe) and so on. However, for the same query keyword "床" (bed), if the user is a technician in the field of mechanical equipment, the latent word meaning should be "机床" (lathe), rather than "单人床" (single bed), "双人床" (double bed) and "木板床" (wooden bed), etc. In this embodiment, "technician in the field of mechanical equipment" will be the user characteristic, which is used to classify the user feedback logs for better finding the latent word meaning of the word.

In another example, the first set of query keywords that is input is "苹果" (apple), if the user characteristic is computer worker, the second set of query keywords in the category of computer is used as the matching set; if the user characteristic is food industry worker or agricultural worker, the second keyword in the category of fruit will be used as the matching set. During specific implementation, the user characteristic may include user region (for example, country, area and, town), previous web pages browsed by the user frequently, web pages browsed by the user lately, previous search keywords input by the user, user gender, age, career, and taste, etc. For the analyzing and classifying of user characteristics, technical measures such as IP address analysis, user-side browser historical data analysis, user-side COOKIE data analysis and user web registration information analysis, etc., may be used as required and this may be easily understood by one skilled in the art.

Based on the same inventive conception, this application further provides a method and a device for word matching and a device for information query. Because the method and device for word matching, the device for information query and the method for information query are based on the same inventive conception, they have similar principles. Therefore, in the implementation of the method and device for word matching and the device for information query, reference may be made to the implementation of the method for information query and the repeated parts will not be described again here.

The implementation of an embodiment of a query processing system is described below. The system is described to include a number of modules, which in turn includes submodules or units. The modules/submodules/units can be implemented as software components executing on one or more processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The modules/submodules/units may be implemented on a single device or distributed across multiple devices. The functions of the modules may be merged into one another or further split into multiple sub-modules.

Figure 2:
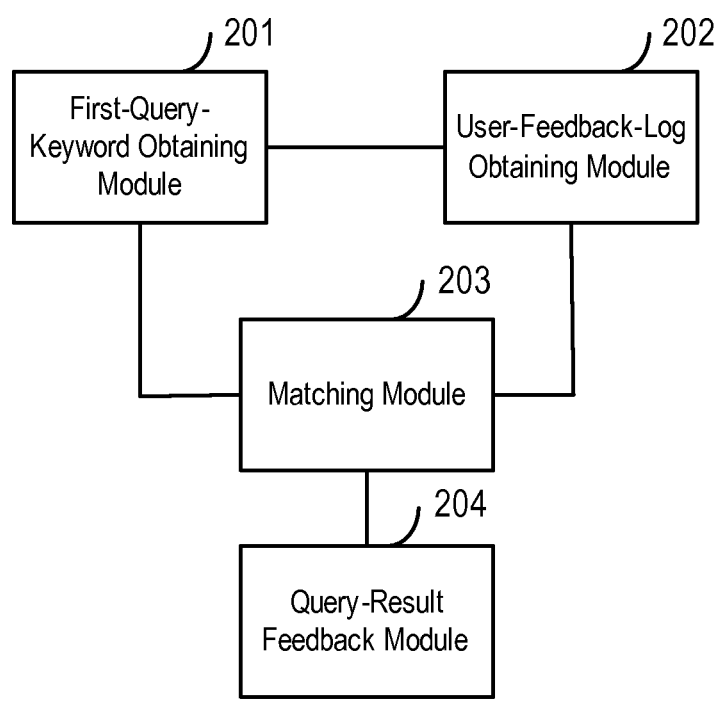
FIG. 2 is a block diagram illustrating an embodiment of a query processing system.

FIG. 2 is a block diagram illustrating an embodiment of a query processing system. As shown in the figure, the system includes: a first-query-keyword obtaining module 201, for obtaining the first set of query keywords based on user input; a user-feedback-log obtaining module 202, for obtaining a user feedback log of the first set of query keywords; a matching module 203, for determining the second set of query keywords that matches the first set of query keywords according to the user feedback log; and a query-result feedback module 204, for feeding back a query result that takes the second set of query keywords as a target.

In implementation, the user-feedback-log obtaining module may be further adapted to obtain a user feedback log, which includes all previous historical query results that take words in the first set of query keywords as search targets and all previous selection frequencies of the user on the historical query results.

The matching module may be further adapted to determine the second set of query keywords that matches the first set of query keywords according to the historical query results and selection frequencies in the user feedback log.

In implementation, the user-feedback-log obtaining module may be further adapted to obtain, as the selection frequencies, the selection frequencies on historical query results and/or the selection frequencies on the contents of historical query results.

Figure 3:
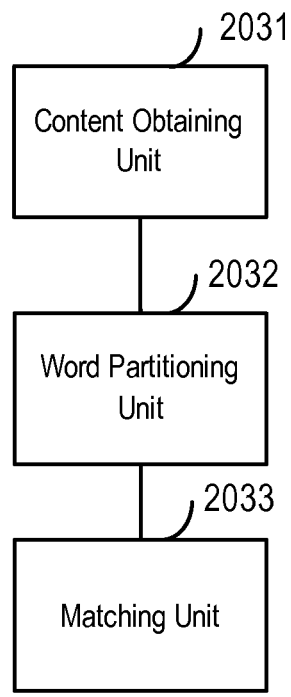
FIG. 3 is a block diagram illustrating an embodiment of the matching module.

FIG. 3 is a block diagram illustrating an embodiment of the matching module. As shown in the figure, the matching module includes: a content obtaining unit 2031, for obtaining the contents of historical query results corresponding to the first set of keywords; a word partitioning unit 2032, for carrying out word partitioning on the contents of historical query results, and obtaining words after word partitioning; and a matching unit 2033, for determining the second set of query keywords that matches the first set of query keywords according to the selection frequencies of the words after word partitioning.

In implementation, the word partitioning unit may also be further adapted to obtain, after word partitioning, words of one or more of the following types: words adjacent to the first set of query keywords after word partitioning; words containing the first set of query keywords after word partitioning; and words containing a component part of the first set of query keywords after word partitioning.

In implementation, the matching module may be further adapted to determine the second set of query keywords that matches the first set of query keywords according to the historical query results and selection frequencies, wherein the selection frequencies are larger than a given threshold.

Figure 4:
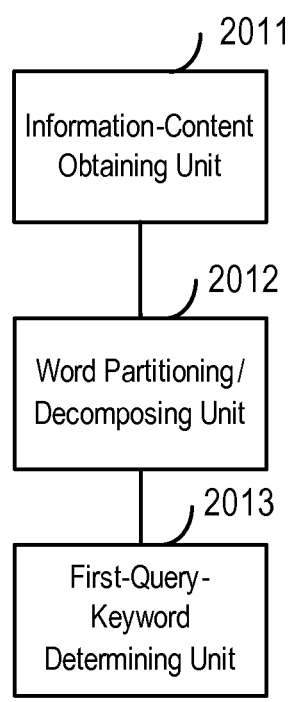
FIG. 4 is a block diagram illustrating an embodiment of the first-query-keyword obtaining module.

FIG. 4 is a block diagram illustrating an embodiment of the first-query-keyword obtaining module. As shown in the figure, the first-query-keyword obtaining module may include: an information-content obtaining unit 2011, for obtaining the information content that is input by a user; a word partitioning/decomposing unit 2012, for obtaining words after word partitioning after carrying out word partitioning on the information content, and/or decomposing the information content into characters; and a first-query-keyword determining unit 2013, for taking the words and/or characters after word partitioning as the first set of query keywords.

In some embodiments, the user-feedback-log obtaining module may be further adapted to obtain, as the selection frequencies, one or a combination of: click frequencies on the historical query results, display frequencies on the historical query results, reading time on the historical query results, and importance of the historical query results.

In some embodiments, the first-query-keyword obtaining module may be further adapted to obtain the user characteristic of a user when the user inputs the first set of query keywords; the user-feedback-log obtaining module may be further adapted to obtain a user feedback log according to the user characteristic.

In some embodiments, the first-query-keyword obtaining module may be further adapted to obtain the user characteristic of a user when the user inputs the first set of query keywords;

the user-feedback-log obtaining module may also be further adapted to, when obtaining a user feedback log, obtain a user feedback log that includes historical query results that take the word to be matched as an object and the selection frequencies of the user on the historical query results, wherein the historical query results include the user characteristic.

In some embodiments, the first-query-keyword obtaining module may also be further adapted to obtain the user characteristic of a user when the user inputs the first set of query keywords. The matching module may be further adapted to determine the second set of query keywords according to the user characteristic when determining the second set of query keywords according to the user feedback log.

Figure 5:
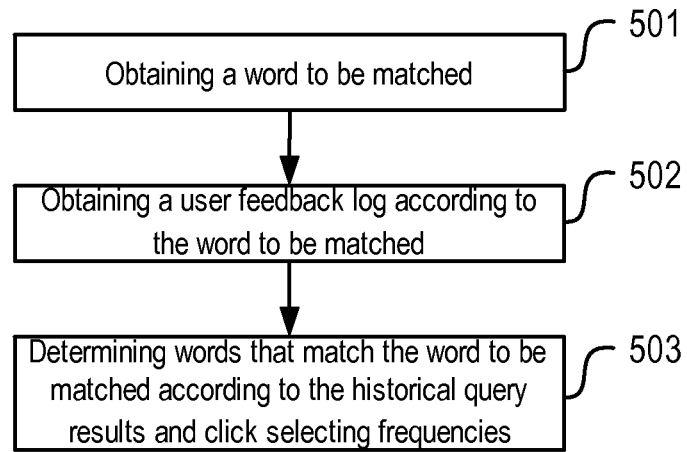
FIG. 5 is a flowchart illustrating an embodiment of a process for word matching.

FIG. 5 is a flowchart illustrating an embodiment of a process for word matching. As shown in the figure, it may include the following steps when word matching is performed: at 501, obtaining a word to be matched, such as the first set of query keywords; at 502, obtaining a user feedback log according to the word to be matched, wherein the user feedback log includes all previous historical query results that take the word to be matched as an object and all previous selection frequencies of users on the historical query results; at 503, determining words that match the word to be matched according to the historical query results and selection frequencies.

In some embodiments, the selection frequencies include: selection frequencies on historical query results and/or selection frequencies on the contents of historical query results.

In some embodiments, the process of determining words that match the word to be matched according to the selection frequencies on the contents of historical query results includes the following: obtaining the contents of historical query results of the word to be matched; carrying out word partitioning on the contents of historical query results, and obtaining words after word partitioning; and determining words that match the word to be matched according to the selection frequencies of the words after word partitioning.

In various embodiments, words after word partitioning refer to words of one or more of the following types: words adjacent to the word to be matched after word partitioning; words containing the word to be matched after word partitioning; and words containing a component part of the word to be matched after word partitioning.

In some embodiments, when words that match the word to be matched are determined according to the historical query results and selection frequencies, the selection frequencies are larger than a given threshold.

The process of obtaining a keyword to be matched may be as follows: obtaining the information content that is input by a user; obtaining words after word partitioning after carrying out word partitioning on the information content and/or decomposing the information content into characters; and taking the words and/or characters after word partitioning as the word to be matched.

In some embodiments, the selection frequencies may include one or a combination of the following: click frequencies on the historical query results, display frequencies on the historical query results, reading time on the historical query results, and importance of the historical query results.

In some embodiments, the method may also further include the steps of obtaining the user characteristic of a user when the user inputs a word to be matched and obtaining a user feedback log according to the user characteristic when obtaining the user feedback log.

In some embodiments, the method may also further include the following steps: obtaining the user characteristic of a user when the user inputs a word to be matched; obtaining a user feedback log, wherein the user feedback log obtained includes historical query results that take the word to be matched as an object and the selection frequencies of users on the historical query results; and the historical query results include the user characteristic.

In some embodiments, the method may also further include the steps of obtaining the user characteristic of a user when the user inputs a word to be matched and determining words that match the word to be matched according to the user characteristic when determining words that match the word to be matched according to the user feedback log.

Figure 6:
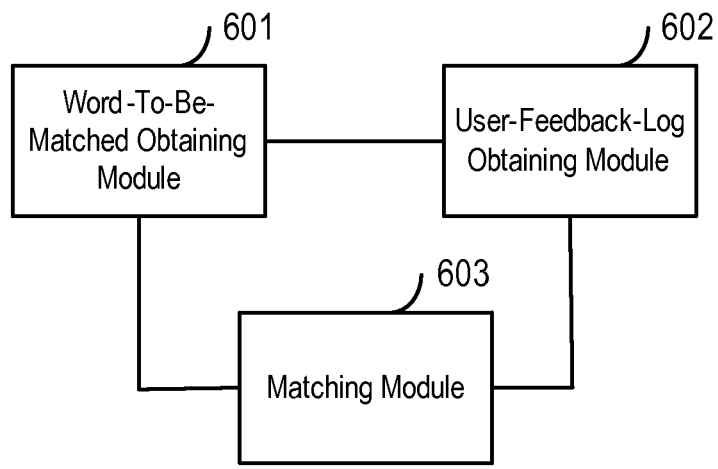
FIG. 6 is a block diagram illustrating an embodiment of a device for word matching.

FIG. 6 is a block diagram illustrating an embodiment of a device for word matching. As shown in the figure, the device includes: a word-to-be-matched obtaining module 601, for obtaining a word to be matched; a user-feedback-log obtaining module 602, for obtaining a user feedback log according to the word to be matched; and a matching module 603, for determining words that match the word to be matched according to the user feedback log.

In some embodiments, the user-feedback-log obtaining module may be further adapted to obtain a user feedback log, which includes all previous historical query results that take the word to be matched as a target and all previous selection frequencies of users on the historical query results; and the matching module may be further adapted to determine words that match the word to be matched according to the historical query results and selection frequency in the user feedback log.

The user-feedback-log obtaining module may be further adapted to obtain, as the selection frequencies, the selection frequencies on historical query results and/or the selection frequencies on the contents of historical query results.

In some embodiments, the matching module includes: a content obtaining unit, for obtaining the contents of historical query results of the word to be matched; a word partitioning unit, for carrying out word partitioning on the contents of historical query results and obtaining words after word partitioning; and a matching unit, for determining words that match the word to be matched according to the selection frequencies of the words after word partitioning.

The word partitioning unit may be further adapted to obtain, after word partitioning, words in the following modes or a combination thereof: words adjacent to the word to be matched after word partitioning; words containing the word to be matched after word partitioning; and words containing a component part of the word to be matched after word partitioning.

The matching module may be further adapted to determine words that match the word to be matched according to the historical query results and selection frequencies, wherein the selection frequencies are larger than a given threshold.

The word-to-be-matched obtaining module may include: an information-content obtaining unit, for obtaining the information content that is input by a user; a word partitioning/decomposing unit, for obtaining words after word partitioning after carrying out word partitioning on the information content and/or decomposing the information content into characters; and a word-to-be-matched determining unit, for taking the words and/or characters after word partitioning as the word to be matched.

The user-feedback-log obtaining module may be further adapted to obtain, as the selection frequencies, one or a combination of: click frequencies on the historical query results, display frequencies on the historical query results, reading time on the historical query results, and importance of the historical query results.

In some embodiments, the word-to-be-matched obtaining module is further adapted to obtain the user characteristic of a user when the user inputs a word to be matched; the user-feedback-log obtaining module is further adapted to obtain a user feedback log according to the user characteristic.

In some embodiments, the word-to-be-matched obtaining module may be further adapted to obtain the user characteristic of a user when the user inputs a word to be matched and the user-feedback-log obtaining module may also be further adapted to, when obtaining a user feedback log, obtain a user feedback log that includes historical query results that take the word to be matched as an object and the selection frequencies of users on the historical query results, wherein the historical query results include the user characteristic.

In some embodiments, the word-to-be-matched obtaining module may also be further adapted to obtain the user characteristic of a user when the user inputs a word to be matched and the matching module may be further adapted to, when determining words that match the word to be matched according to the user feedback log, determine words that match the word to be matched according to the user characteristic.

It can be seen from the above embodiments that, based on the analysis of a user feedback log, the latent semantics of a word may be automatically found and the hidden relation between words can be found correctly. Further, the latent semantics of a word automatically found and the correlated semantics of a word to be queried may be used to improve the effect of the search engine. Moreover, when the latent word meaning of a query word is automatically found, a similar effect may also be obtained according to the word frequencies of separate words immediately adjacent to the query word in the search string, rather than only according to the word partitioning result. Therefore, in an embodiment of this application, the performance of the search engine may be improved via the latent word meaning of a word that is automatically found. In comparison with the traditional techniques, search accuracy and efficiency may be improved.

For easy description, the above system is divided into, according to functions, various modules or units, which are described respectively. However, during the implementation of the invention, the function of each module or unit may be realized in one or more software and/or hardware.

One skilled in the art should understand that, the embodiments of this application may be provided as a method, a system, or a computer program product. Therefore, this application may be in the form of full hardware embodiments, full software embodiments, or a combination thereof. Moreover, this application may be in the form of a computer program product that is implemented on one or more computer-usable storage media (including, without limitation, magnetic disk storage, CD-ROM and optical storage) containing computer-usable program codes.

This application is described referring to the flow chart and/or block diagram of the method, device (system) and computer program product according to the embodiments of this application. It should be understood that, each flow and/or block in the flow chart and/or block diagram and the combination of flow and/or block in the flow chart and/or block diagram may be realized via computer program instructions. Such computer program instructions may be provided to the processor of a general-purpose computer, special-purpose computer, a built-in processor or other programmable data processing devices, to produce a machine, so that the instructions executed by the processor of a computer or other programmable data processing devices may produce a device for realizing the functions specified in one or more flows in the flow chart and/or one or more blocks in the block diagram.

Such computer program instructions may also be stored in a computer-readable storage that can guide a computer or other programmable data processing devices to work in a specific mode, so that the instructions stored in the computer-readable storage may produce a manufacture including a commander equipment, wherein the commander equipment may realize the functions specified in one or more flows of the flow chart and one or more blocks in the block diagram.

Such computer program instructions may also be loaded to a computer or other programmable data processing devices, so that a series of operational processes may be executed on the computer or other programmable devices to produce a computer-realized processing, thereby the instructions executed on the computer or other programmable devices may provide a process for realizing the functions specified in one or more flows in the flow chart and/or one or more blocks in the block diagram.

Although preferred embodiments of this application have been described above, other variations and modifications can be made by one skilled in the art in the teaching of the basic creative conception. Therefore, the preferred embodiments and all these variations and modifications are intended to be contemplated by the appended claims.

It will be appreciated that one skilled in the art may make various modifications and alterations to the present invention without departing from the spirit and scope of the present invention. Accordingly, if these modifications and alterations to the present invention fall within the scope of the claims of the present invention and their equivalents, the present invention intends to include all these modifications and alterations.

What is claimed is:

1. A method of performing a query, comprising:
receiving a user input;
obtaining a user characteristic of a user who generated the user input;
determining a first set of query keywords based at least in part on the user input;
obtaining, based on at least some of the first set of query keywords, a user feedback log that includes historical query results;
determining at least one category among a plurality of categories of the user feedback log based on the user characteristic of the user;
determining a second set of query keywords based on the at least one category of the user feedback log, wherein the user feedback log includes selection frequencies, and wherein the determining of the second set of query keywords comprises:
generating the second set of query keywords based on the first set of query keywords and the at least one category, comprising:
determining a first keyword of the second set of query keywords that matches a second keyword of the first set of query keywords according to a selection frequency of the first keyword, comprising:
determining whether the selection frequency of the first keyword falls below or is equal to a threshold; and
in the event that the selection frequency falls below or is equal to the threshold, removing the first keyword from the second set of query keywords; and
making a query based on at least some of the second set of query keywords.

2. The method of claim 1, further comprising:
returning a query result; and
updating a user feedback database with the query result.

3. The method of claim 1, wherein the user input is partitioned into a plurality of partitioned words based on context, and the first set of query keywords includes the plurality of partitioned words.

4. The method of claim 3, wherein the first set of query keywords includes at least one of the follow: one or more words that are adjacent to at least some of the plurality of partitioned words, one or more words that include at least a portion of the plurality of partitioned words, or one or more words that include at least a partitioned word in the plurality of partitioned words.

5. The method of claim 1, wherein the user feedback log includes a historical query result obtained using at least some of the first set of query keywords as a query target.

6. The method of claim 1, wherein the selection frequency is determined based on at least one of the following: click frequencies on the historical query results, display frequencies on the historical query results, reading time on the historical query results, or importance of the historical query results.

7. The method of claim 1, wherein the second set of query keywords includes one or more latent words that correspond to the first set of query keywords, the latent words having latent meanings with respect to the first set of query keywords.

8. The method of claim 1, wherein making the query based on at least some of the second set of query keywords includes sending the at least some of the second set of query keywords to a search engine.

9. A query system comprising:
an interface configured to receive a user input;
one or more processors coupled to the interface, configured to:
obtain a user characteristic of a user who generated the user input;
determine a first set of query keywords based at least in part on the user input;
obtain, based on at least some of the first set of query keywords, a user feedback log that includes historical query results;
determine at least one category among a plurality of categories of the user feedback log based on the user characteristic of the user;
determine second set of query keywords based on the at least one category of the user feedback log, wherein the user feedback log includes selection frequencies, and wherein the determining of the second set of query keywords comprises to:
generate the second set of query keywords based on the first set of query keywords and the at least one category, comprising to:
determine a first keyword of the second set of query keywords that matches a second keyword of the first set of query keywords according to a selection frequency of the first keyword, comprising to:
determine whether the selection frequency of the first keyword falls below or is equal to a threshold; and
in the event that the selection frequency falls below or is equal to the threshold, remove the first keyword from the second set of query keywords; and
make a query based on at least some of the second set of query keywords; and
one or more memories coupled to the one or more processors, configured to provide the processors with instructions.

10. The system of claim 9, further comprising:
returning a query result; and
updating a user feedback database with the query result.

11. The system of claim 9, wherein the user input is partitioned into a plurality of partitioned words based on context, and the first set of query keywords includes the plurality of partitioned words.

12. The system of claim 11, wherein the first set of query keywords includes at least one of the follow: one or more words that are adjacent to at least some of the plurality of partitioned words, one or more words that include at least a portion of the plurality of partitioned words, or one or more words that include at least a partitioned word in the plurality of partitioned words.

13. The system of claim 9, wherein the user feedback log includes a historical query result obtained using at least some of the first set of query keywords as a query target.

14. The system of claim 9, wherein the selection frequency is determined based on at least one of the following: click frequencies on the historical query results, display frequencies on the historical query results, reading time on the historical query results, or importance of the historical query results.

15. The system of claim 9, wherein the second set of query keywords includes one or more latent words that correspond to the first set of query keywords, the latent words having latent meanings with respect to the first set of query keywords.

16. The system of claim 9, wherein making the query based on at least some of the second set of query keywords includes sending the at least some of the second set of query keywords to a search engine.

17. A computer program product being embodied in a non-transitory computer readable medium and comprising computer instructions when executed by one or more processors perform the following:
  receiving a user input;
  obtaining a user characteristic of a user who generated the user input;
  determining a first set of query keywords based at least in part on the user input;
  obtaining, based on at least some of the first set of query keywords, a user feedback log that includes historical query results;
  determining at least one category among a plurality of categories of the user feedback log based on the user characteristic of the user;
  determining a second set of query keywords based on the at least one category of the user feedback log, wherein the user feedback log includes selection frequencies, and wherein the determining of the second set of query keywords comprises:
    generating the second set of query keywords based on the first set of query keywords and the at least one category, comprising to:
      determining a first keyword of the second set of query keywords that matches a second keyword of the first set of query keywords according to a selection frequency of the first keyword, comprising:
        determining whether the selection frequency of the first keyword falls below or is equal to a threshold; and
        in the event that the selection frequency falls below or is equal to the threshold, removing the first keyword from the second set of query keywords; and
  making a query based on at least some of the second set of query keywords.

\* \* \* \* \*